United States Patent [19]

Balsam et al.

[11] 3,713,980
[45] Jan. 30, 1973

[54] PROCESS FOR THE PREPARATION OF PERUVOSIDE

[75] Inventors: Günter Balsam; Otto Kufner, both of Darmstadt, Germany

[73] Assignee: Merck Patent Gesellschaft mit beschrankter Haftung, Darmstadt, Germany

[22] Filed: Nov. 24, 1970

[21] Appl. No.: 92,177

[30] Foreign Application Priority Data

Nov. 25, 1969 Germany.....................P 19 59 039.7

[52] U.S. Cl......................195/32, 195/2, 260/210 R
[51] Int. Cl. ...............................................C12b 1/00
[58] Field of Search..........195/2, 32, 3, 27, 42, 7, 11, 195/31; 260/210 R

[56] References Cited

OTHER PUBLICATIONS

Rangaswami et al., Chem. Abs., Vol. 53, No. 9373e, 1959.
Sun et al., Chem. Abs., Vol. 63, No. 2049b, 1965.
Rao et al., Chem. Abs., Vol. 67, No. 51035f, 1967.

*Primary Examiner*—Lionel M. Shapiro
*Assistant Examiner*—Gary M. Nath
*Attorney*—Millen, Raptes & White

[57] ABSTRACT

Peruvoside is obtained in high yield employing a greasy vegetable source of peruvoside, e.g., the fruit or seeds of *Apocynacea Thevetia peruviana*, for the fermentation step which releases glycosides from vegetable sources thereof. The glycosides are then extracted from the fermentation product and the peruvoside is separated from the extracted glycoside mixture by chromatography.

9 Claims, No Drawings

3,713,980

PROCESS FOR THE PREPARATION OF PERUVOSIDE

BACKGROUND OF THE INVENTION

This invention relates to methods of preparing high yields of peruvoside from vegetable sources thereof.

Peruvoside is a vegetable glycoside found, e.g., in the plant *Apocynacea Thevetia peruviana* (Pers.) K. Schum. (synonym: *Thevetia neriifolia* Juss.). The compound was first described in 1958 in I. Sci. Industr. Research (India) 17 B, 331.

Peruvoside exhibits cardiotonic activity and is characterized by its relatively minor effect, compared to other cardiac glycosides, on heart beat rate, impulse formation and impulse conduction systems. Peruvoside also exhibits advantages of digitoxin and strophanthin of a high resorption rate simultaneously with a high decomposition rate.

Relatively low yields of peruvoside have been obtained in the past. These peruvosides have been prepared by comminuting and degreasing the seeds of *Thevetia peruviana* according to well known methods and then subjecting the seeds to a fermentation which releases the peruvoside from its bound form. The fermentation process results in the formation of a mixture of glycosides which is then extracted and the peruvoside separated therefrom by chromatography.

One of the important shortcomings of this prior art process is that a degreased seed powder must be employed as the starting material. In order to obtain a degreased seed powder, several processing steps are required, viz., the seeds must be isolated from the fruit, comminuted, extracted several times with petroleum ether to accomplish thorough degreasing, and then dried again.

Another disadvantage of the prior art process is that only a small amount of peruvisode is produced, viz., approximately 0.4 percent, based on the fat-free pulverized seeds. When fruit of *Thevetia peruviana* is employed, the yield is only 0.03 – 0.04 percent. Moreover, even these yields in peruvoside cannot always be achieved. There thus remains a need for a simple and efficient process for producing high yields of peruvoside from a peruvoside-containing vegetable matter.

OBJECTS OF THE INVENTION

It is a primary object of the invention to provide a new and efficient process for obtaining high yields of peruvoside together with a simultaneous reduction in the number of process steps compared to conventional processes. It is a further object to provide a process which does not require repeated grinding and drying steps. Still another most important object is to provide a process which does not require large quantities of solvent to prepare the peruvoside-containing vegetable matter for the fermentation thereof. A still further object of the invention is to provide a process whereby the formation of peruvoside oxidation products, which interfere with conventional processes, is significantly prevented.

An additional object of the invention is to provide a process for preparing peruvoside which is not impeded by the presence of substantial amounts of oil normally present in peruvoside-rich starting materials.

Other objects will be apparent to those skilled in the art to which this invention pertains.

SUMMARY OF THE INVENTION

According to this invention, peruvoside is obtained in a simpler fashion and in consistently higher yields than obtained heretofore without the necessity of degreasing the peruvoside-containing vegetable matter prior to the fermentation of said peruvoside-containing vegetable matter by subjecting a greasy vegetable source of peruvoside to a fermentation process which results in the formation of a mixture of glycosides which are then extracted from the fermentation product and the peruvoside is separated from the thus-extracted mixture of glycosides by chromatography.

DETAILED DISCUSSION

The simple manner of carrying out the process of this invention and the relatively high yields of peruvoside obtained therefrom is unexpected in view of the prior art processes disclosed in the literature. It has always been necessary heretofore, both in industrial as well as laboratorial preparation of secondary glycosides from seeds and fruit, to degrease the vegetable starting matter prior to fermentation. Until now, only those starting materials containing either no fat or only a small amount of fat, usually less than 5 percent, e.g., leaves, branches or roots, could be employed in the fermentation step without previous degreasing. It was believed that sources of peruvoside which contained large amounts of fat, e.g., seeds or fruit containing up to 65 percent fat, were not practical starting materials for the fermentation. (Cf. f.e. Rangaswami and Rao, Indian Pat. No. 66 196 (1958); Helfenberger and Reichstein, Helv. Chim. Acta 31, 1470 (1948); Frèrejaque and Hasenfratz, Compt. Rend. 222, 642, 815 (1946)).

Another advantage of the process of this invention is that the repeated drying of a degreased seed powder is no longer required. In addition, it is only necessary to have the starting material comminuted once, compared to the conventional process wherein repeated grinding operations must be conducted.

Furthermore, in the conventional process, a large amount of petroleum ether was required for the degreasing step, much of which was lost during the drying of the degreased starting material. In contrast thereto, only a small amount of petroleum ether is required in the process of this invention. The petroleum ether is employed in an optional degreasing step conducted after the fermentation step and the petroleum ether can be recovered therefrom. Thus, it is possible to carry out the process in a more simple and efficient manner with a considerable saving in labor, materials and apparatus. A still further advantage of this process is that the oxidation-sensitive peruvoside is not exposed to air for prolonged periods of time, thus avoiding the formation of oxidation products, which interfere with the work-up process during the subsequent separation by chromatography.

Still another advantage is that the oil contained in the starting material does not interfere with the novel process of this invention as compared to conventional processes. In the process of this invention, the largest portion of the oil remains in the fermented drug and is separated from the glycosides after the extraction, without any special measures having to be taken.

In summary, the novel process of this invention, compared to the conventional method, affords a considerable saving in working time and apparatus, while simultaneously obtaining high yields of pure peruvoside. According to the process of this invention, peruvoside is obtained from the fruit of *Thevetia peruviana* in yields of 0.1 – 0.12 percent (based on the amount of fruit employed). Thus, the yield is from two to four times as high as that of the conventional method.

The preferred starting material for the novel process is the highly fatty fruit or seeds of peruvoside-containing plants, preferably *Thevetia peruviana*. Such a non-degreased fatty plant source of peruvoside is comminuted, e.g., by grinding, and, after the addition of water, then fermented in a conventional manner. For purposes of fermentation, the mixture is generally allowed to stand for up to several days, usually from 1 to 10 days, preferably about 5 days, at a temperature of about 30°–60° C., preferably about 45°–55° C. The enzymes present in the starting material split off glucose from the primary glycosides during this fermentation period.

During the fermentation step, the fermentation mixture is protected against mold formation by the addition of a conventional additive, including an inert liquid, e.g., a liquid hydrocarbon, such as, for example, xylene or preferably toluene, a high-boiling petroleum ether or a preservative, e.g., methyl p-hydroxybenzoate.

According to a preferred embodiment of the invention, an inert additive which improves the filtering properties of the entire mixture is also added to the fermentation mixture. Suitable inert additives are, for example, inert incompact inorganic filter aids, e.g., asbestos, vermiculite or a similar inert organic substance, e.g., grain chaff, cut straw, or a plastic in expanded form, e.g., particles of polystyrene foam. The use of such additives is especially recommended when seeds, e.g., of *Thevetia peruviana*, are employed as starting material. When seeds of *Thevetia peruviana* are employed, about 25–40 percent of such an incompact inert additive is added to the fermentation mixture. When the fruit of *Thevetia peruviana* is employed, lesser amounts, e.g., about 5–20 percent of such additives are usually employed. Grain chaff is the preferred filter aid.

In the above-described fermentation step, release of the peruvoside is effected by the natural enzymes present in the vegetable material. However, to accelerate the fermentation process, a glucose-cleaving enzyme, e.g., cellulase or molluscous enzyme, can be added to the fermentation mixture.

After the fermentation step, the thus-obtained mixture is then subjected to a solvent extraction step, employing a solvent for the secondary glycosides formed during the fermentation step. Preferred solvents are water-miscible polar solvents, including the lower-alkanols, e.g., methanol, ethanol and isopropanol, and ketones, e.g., acetone. Especially preferred are acetone and methanol, because of their low boiling points. Both can be removed again from the mixture at low temperature, which is more gentle to the sensitive glycosides than the conditions of the conventional process, which employs ethanol in the extraction step. The extraction can be conducted continuously, for example, by countercurrent extraction, or discontinuously, i.e., batchwise. When a discontinuous method of extraction is employed, the glycosides are usually completely separated from the fermentation mixture after 6–8 extractions.

According to a preferred embodiment of the invention, the glycoside extracts are concentrated prior to chromatographic separation of the peruvoside, preferably under reduced pressure at a relatively low temperature, preferably below 60° C., e.g., about 30°–40 C., when acetone or methanol was the extracting solvent. The extracts are usually concentrated to about 1 to 10 percent of their original volume. The concentrated extracts can then be degreased by mixing with a nonpolar organic solvent for fats, e.g., petroleum ether, carbon tetrachloride, diethyl ether, benzene, toluene, etc. Solvents which are suitable for the degreasing step are those in which the peruvoside is relatively or completely insoluble and in which the fats are very soluble.

The glycosides in the thus-obtained extract, which is preferably concentrated and preferably also degreased, are thereafter extracted therefrom employing a slightly polar, water immiscible solvent, e.g., ethyl acetate, a polar chlorinated hydrocarbon, e.g., chloroform or dichloromethane or a mixture of such solvents. Especially suitable are those solvents having a low boiling point, e.g., below 80° C. It is advantageous to concentrate the thus-obtained glycoside extract. The concentration is suitably conducted under reduced pressure at a relatively low temperature, e.g., from 20° to 60° C., preferably from 40°–45° C. Desirably, the extracts are concentrated to about one-tenth to one-fiftieth of their original volume. The extract can be dried prior to concentration thereof, for example with the aid of a drying agent, e.g., calcium chloride, sodium sulfate or magnesium sulfate. However, the drying step is not necessary when only minor amounts of water are contained in the extract since small amounts of water are removed by azeotropic distillation along with the extraction solvent during the concentration of the extract.

The extract, which has been subjected to a concentrating step and, optionally, a drying step, can then be employed directly in the chromatographic separation step. However, it is preferable to first mix the extract with a precipitant before the desired peruvoside is separated from the extracted glycoside mixture by chromatographic separation. The precipitant is preferably added to the concentrate in an amount sufficient to cause complete precipitation of the glycosides therefrom, e.g., about 2–5 times the volume of the concentrate of a solvent in which the glycosides are insoluble. Suitable solvent precipitants are nonpolar organic solvents, e.g., petroleum ether and carbon tetrachloride with petroleum ether being preferred. In general, complete precipitation is usually achieved after several hours, for example, after about 10–20 hours. When the starting material is the fruit of *Thevetia peruviana*, the crude glycoside mixture is obtained in a yield of about 1 percent once complete precipitation has been achieved. When the starting material is the seeds of *Thevetia peruviana*, a yield of about 4 percent is obtained. Both yields are based on the weight of the non-degreased vegetable matter used as the starting material for this process.

The petroleum ether employed in the precipitation step also functions simultaneously as a degreasing agent. Thus, a separate degreasing step after the fermentation is not necessary. This is only possible in the process of the present invention, since only a relatively small amount of oil is present in the glycoside extract obtained from the fermentation step. Thus, when a petroleum ether precipitant is employed during a separate precipitation step, any oil present in the extract is separated from the glycoside mixture during the precipitation of the glycoside mixture. As mentioned above, the precipitation step is conducted prior to the separation of the peruvoside from the remaining glycosides by chromatography.

The subsequent separation of the peruvoside from the crude glycoside mixture by chromatography is conducted in a conventional manner, e.g., by column chromatography. Suitable adsorbents are the inert substances normally employed in chromatography, e.g., aluminum oxide, kieselguhr, silica gel, magnesium silicates and/or calcium phosphates, with silica gel being particularly preferred.

The peruvoside is separated from the undesired glycosides, e.g., neriifolin, using suitable solvent mixtures, for example, the polar, water-immiscible solvents described above. It is advantageous to employ the same solvent for both the chromatographic separation step and the preceding second extraction of the crude glycoside mixture. Preferred solvents include, e.g., ethyl acetate, dichloromethane and chloroform. Due to the special sensitivity of peruvoside to oxidation, the chromatographic separation is suitably conducted in the presence of an inert gas atmosphere, e.g., nitrogen. In this connection, the chromatographic step is conducted in accordance with conventional methods by first eluting the less polar accompanying glycosides, e.g., cerberine, neriifolin, acetylperuvoside, using a less polar solvent or solvent mixture and then eluting the peruvoside with a more polar solvent or solvent mixture.

The eluate fractions containing pure peruvoside are suitably concentrated under an inert gas, preferably nitrogen or carbon dioxide, until a syrupy consistency is obtained. The residue is then recrystallized in the usual manner, also preferably under an inert gas.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Two kilograms of the ground fruit of *Thevetia peruviana* is mixed with 100 g. of grain chaff and moistened with 900 ml. of hot water (approximately 60° C.). The mixture is mixed with 20 ml. of toluene and maintained at 45°–55° C. in a closed vessel for 5 days. The thus-fermented material is extracted six times with 1,200 ml. portions of acetone. The combined extracts are concentrated at 30° C. under reduced pressure, until there remains about 600 ml. of a dark colored aqueous concentrate. The latter is shaken out with an equal volume of petroleum ether. The organic phase is discarded after recovering the petroleum ether. The thus-degreased aqueous concentrate is extracted six times with 500 ml. portions of dichloromethane. The dichloromethane extracts are dried over sodium sulfate, combined, and concentrated to about 100 ml. The residue is then stirred into 250 ml. of petroleum ether. After standing overnight, the thus-separated crystallized product is vacuum-filtered, washed with petroleum ether and dried at about 40° C.

The thus-obtained crude glycoside mixture (21 g.) is dissolved in a mixture of chloroform/methanol and chromatographed on a column of silica gel. There is thus isolated a small amount of oil and fat, a total of 15.5 g. of cerberine, acetylperuvoside and neriifolin, and 2.2 g. of pure peruvoside, m.p. 160°–163° C.; $[\alpha]_D^{22}$ −70° (c = 1.3 in $CH_3OH$), corresponding to a yield of 0.11 percent, based on the quantity of fruit of *Thevetia peruviana* employed as the starting material.

EXAMPLE 2

One kilogram of ground seeds of *Thevetia peruviana* is mixed with 300 g. of grain chaff and moistened with 500 ml. of hot water (60° C.). After the addition of 10 ml. of toluene, the mixture is allowed to stand in a sealed vessel for 5 days at 45–55° C. Thereafter, the moist drug material is extracted six times with 500 ml. portions of methanol. The extracts are concentrated at about 30°C. to about 300 ml. Without degreasing, the glycosides are extracted from this aqueous concentrate with three 300 ml. portions followed by three 100 ml. portions of chloroform. The chloroform extracts are then concentrated at about 40° C. to a volume of about 200 ml. This concentrate is then mixed with 500 ml. of petroleum ether. After allowing the mixture to stand overnight, the crystallized product which separated is vacuum-filtered, washed with petroleum ether, and dried at 40° C. Yield in crude glycoside: 46.9 g. From this product, after the usual separation by chromatography, 5.1 g. of pure peruvoside is obtained, m.p. 161°–164° C. This corresponds to a yield of 0.51 percent, based on the weight of the non-degreased seeds of *Thevetia peruviana*.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the commercial production of peruvoside by the fermentation of peruvoside-containing vegetable matter and the solvent extraction of the glycosides from the fermentation product and chromatographic separation of the peruvoside from the extracted glycosides, the improvement which comprises employing in the fermentation process a fatty vegetable source of the peruvoside in non-degreased form.

2. A process according to claim 1 wherein the non-degreased fatty vegetable source of the peruvoside is the fruit or seeds of the plant *Thevetia peruviana*.

3. A process according to claim 1 wherein the glycosides are extracted from the fermentation product with methanol or acetone.

4. A process according to claim 1 wherein prior to chromatography the extracted glycosides are degreased with carbon tetrachloride or petroleum ether.

5. A process according to claim 4 wherein prior to degreasing the methanol or acetone solution of extracted glycosides is concentrated.

6. A process according to claim 4 wherein the glycosides in the degreased concentrated glycoside extract are extracted therefrom with dichloromethane or chloroform.

7. A process according to claim 6 wherein the glycosides are precipitated from the dichloromethane or chloroform solution with petroleum ether.

8. A process according to claim 6 wherein the dichloromethane or chloroform solution is concentrated and the glucosides then precipitated therefrom with petroleum ether.

9. A process according to claim 8 wherein the non-degreased fatty vegetable source of the peruvoside is the fruit or seeds of the plant *Thevetia peruviana*.

* * * * *